(12) United States Patent
Yoshida et al.

(10) Patent No.: US 6,607,256 B2
(45) Date of Patent: Aug. 19, 2003

(54) UNDERCARRIAGE OF A CRAWLER-TYPE VEHICLE

(75) Inventors: Tsuyoshi Yoshida, Hirakata (JP); Kazuyuki Onohara, Hirakata (JP); Taira Ozaki, Hirakata (JP)

(73) Assignee: Kamatsu Ltd., Tokyo (JP)

( * ) Notice: Subject to any disclaimer, the term of this patent is extended or adjusted under 35 U.S.C. 154(b) by 0 days.

(21) Appl. No.: 09/780,353

(22) Filed: Feb. 12, 2001

(65) Prior Publication Data
US 2002/0003376 A1 Jan. 10, 2002

(30) Foreign Application Priority Data
Feb. 14, 2000 (JP) .......................... 2000-077249

(51) Int. Cl.$^7$ .............................................. B62D 55/14
(52) U.S. Cl. ...................................... 305/132; 305/133
(58) Field of Search ................................. 305/124, 129, 305/132, 138, 133, 134, 109, 116; 180/9.5, 9.54

(56) References Cited

U.S. PATENT DOCUMENTS

| | | | |
|---|---|---|---|
| 2,051,864 A | * | 8/1936 | Knox et al. .................. 305/132 |
| 2,093,456 A | * | 9/1937 | Knox |
| 2,982,351 A | * | 6/1961 | Deysher et al. |
| 3,082,043 A | * | 3/1963 | Orton |
| 3,216,520 A | * | 11/1965 | Blonsky ...................... 305/132 |
| 3,601,454 A | * | 8/1971 | Reinsma |
| 3,787,097 A | * | 1/1974 | Orr |
| 3,826,325 A | * | 7/1974 | Purcell et al. ................ 305/132 |
| 4,082,371 A | * | 4/1978 | Werner et al. |
| 4,351,572 A | * | 9/1982 | Fujiwara et al. ............. 305/132 |
| 4,391,341 A | * | 7/1983 | Taghon |
| 4,519,654 A | * | 5/1985 | Satzler et al. ................ 305/132 |
| 4,553,790 A | * | 11/1985 | Boggs ......................... 305/132 |
| 4,582,367 A | * | 4/1986 | Jacquet et al. |
| 4,583,791 A | * | 4/1986 | Nagata et al. |
| 4,681,177 A | * | 7/1987 | Zborowski ................. 180/9.54 |
| 4,744,431 A | * | 5/1988 | Stollinger ................... 180/9.5 |
| 4,881,786 A | * | 11/1989 | Tonsor |
| 5,749,423 A | * | 5/1998 | Burckhartzmeyer et al. ..... 180/9.54 |

* cited by examiner

Primary Examiner—Russell D. Stormer
(74) Attorney, Agent, or Firm—Varndell & Varndell, PLLC (57) ABSTRACT

A crawler-type vehicle undercarriage including a track frame, an idler, a sprocket, a crawler encompassing the idler, track rollers, and the sprocket and the idler, the sprocket and the track frame located to line up in a straight line comprising the crawler-type vehicle undercarriage comprising (i) an idler avoided from pivoting upwardly or downwardly relative to the track frame, (ii) a first arm pivotally mounted at the bottom of the track frame, and (iii) a second arm pivotally connected to end portion of the first arm. The track roller unit adjacent the sprocket is preferably pivoted about a pivot center of the first arm positioned at the bottom of the track frame and toward the idler relative to a pivot center of the second arm. The track roller travel improves a flexibility of the track roller to the crawler, and work in a high tractive force is carried out with the track rollers providing unchangeable real contact areas to the ground.

3 Claims, 11 Drawing Sheets

UNDERCARRIAGE OF A CRAWLER-TYPE VEHICLE

TECHNICAL FIELD

This invention relates generally to an undercarriage of a crawler-type vehicle having multiple track roller bogie unit, more particularly to a hard bottom undercarriage of the crawler-type vehicle which includes a multiple track roller bogie unit, a track frame pivotally mounted on both side of a vehicle body, an idler rotationally mounted to front portion of the track frame so as to provide longitudinal movement thereon only, and a sprocket located to either sides of the vehicle, and further the idler, the sprocket and the track frame are substantially constructed to lined up in straight line.

BACKGROUND ART

Figure 9:
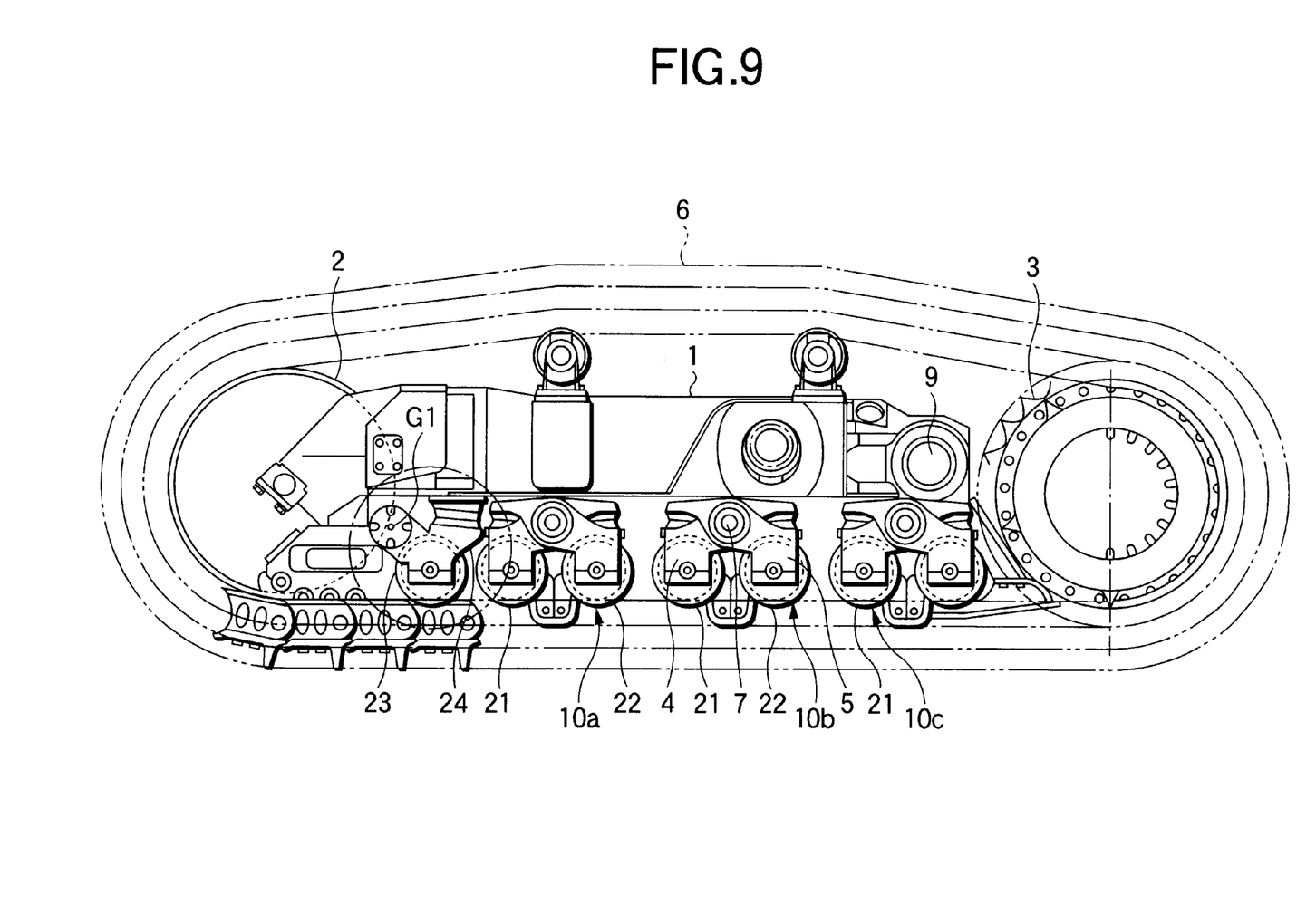
FIG. 9 is a side view of the crawler-type vehicle undercarriage of the first prior art.
Figure 10:
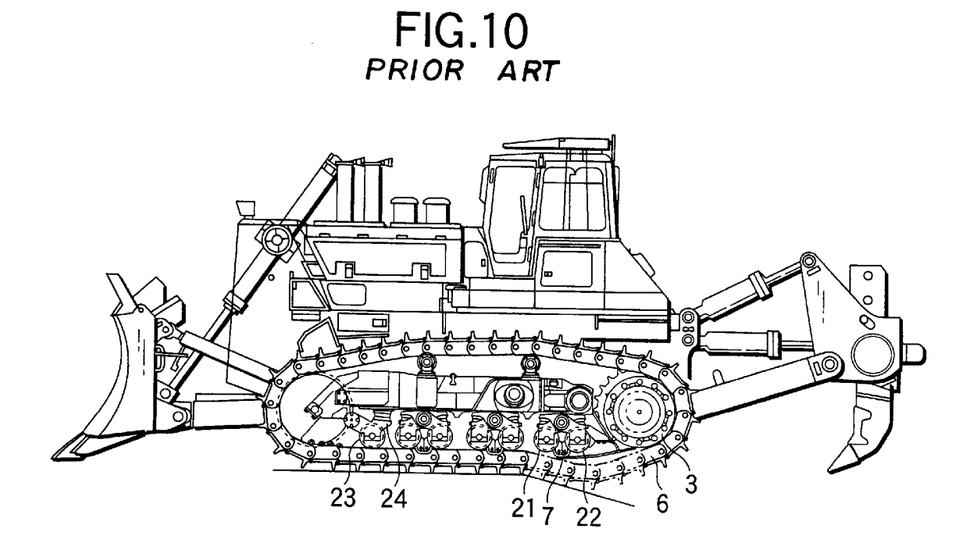
FIG. 10 is a side view of the action of the first prior art.

It is desirable that the track roller disposed most adjacent the idler and the sprocket are respectively required to maintain a proper and good contact with a crawler even when the vehicle is passed over relatively rough terrain. Various methods have been tried to provide so as to achieve these objects. For example, In FIG. 9 is disclosed Japanese patent application No.1998-46233, published patent No. 1999-227643. The track frames 1 resiliently mounted to a pivot shaft 9 fixed to either sides of the vehicle body (not shown), an idler 2 is rotationally mounted at one end portion of the track frame 1 (generally front portion of the vehicle). A sprocket 3 positioned just behind the other end portion of track frame 1 is rotationally mounted adjacent the pivot shaft 9 fixed to either sides of the vehicle body so as to transfer motor drive power to the crawler through transmission and final drive (not shown). Multiple track roller units including track roller 21, 22, 23 are independently moved up and down under the track frame 1 positioned between the idler 2 and the sprocket 3. The crawler 6 encompasses the idler 2, the sprocket and the multiple track rollers 21, 22, 23. These track rollers 21, 22 are rotationally supported at a lower end portion of arms 4, 5 which are mounted at a pin 7 in opposite direction, positioned apart from each other at the bottom of the track frame 1 and pivoted respectively, independently about it. A single pivotal track roller 23 is rotationally supported at lower end portion of an arm 24, which is mounted relative to a pin as pivotal point G1 positioned at the front portion of the track frame 1. When the vehicle is passing over relatively rough terrain, and some portions of the crawler hang down, these track roller units have advantages, because the double bogie track roller units 10a, 10b, 10c, being in engagement with the track rollers 21, 22 and the single track roller 23 also go down and keep proper contacts with the surface of the track shoes, thereby guiding the crawler for a good and quick travel and preventing the flanges of any of track rollers from moving onto the surfaces of the crawler.

However, above-mentioned undercarriage has disadvantages as follows:

Since the bogie track roller units are designed to be mounted in very small space under the track frame 1, each arms 4, 5 supporting the track rollers 21, 22 are respectively limited in length so as to avoid from contacting with the next track rollers on both sides thereof. Therefore, the stroke of travel of the arms 4, 5 are limited. The case may be occurred that when the vehicle is passing over relatively rough terrain, the crawler below adjacent the idler or the sprocket tends to deflect downwardly due to its weight and separate the track roller 21, 22 therefrom. It could be understood that insufficient arms in length travel up and down for a small amount of the track roller travel, resulting in the track rollers not to provide a quick and proper contact with the deflecting portion thereof and in any of the track rollers moving up potentially the surfaces of the track link.

Moreover, when the vehicle goes up a bump, the envelopment along the bump by the crawler is relatively small, because the strokes of the track rollers are not enough. As a result, the track rollers 21, 22 are unable to fully support the vehicle weight. Therefore, when the vehicle has been through the bump and the body of the vehicle goes down, heavy load shock occurs to the track 6, track roller 21,22 and other elements of the vehicle. Such a load shock leads to diminish the durability of the vehicle elements and provide a bad ride of operation.

Figure 11:
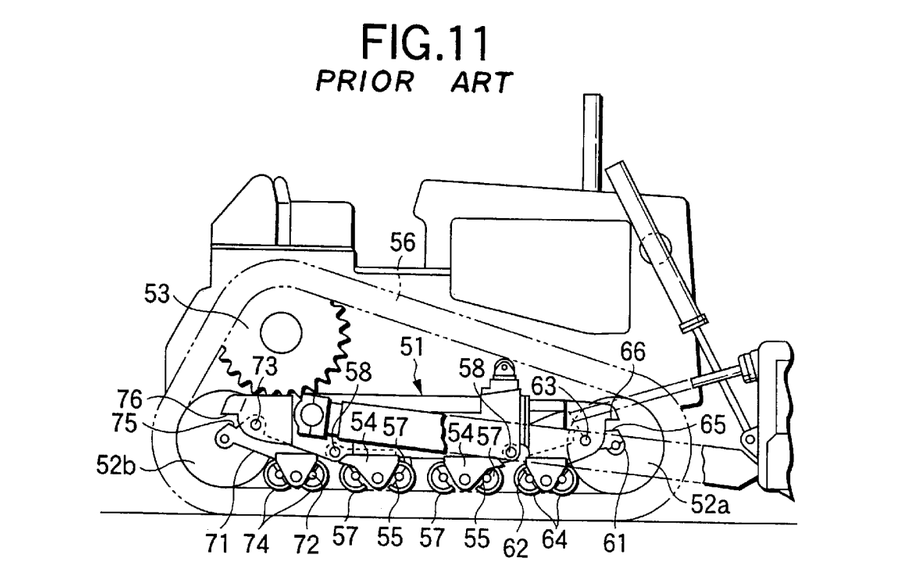
FIG. 11 is a side view of the crawler-type vehicle undercarriage of the second prior art.

In other prior art, for example, Japanese patent application No. 1981-177262, published patent No. 1982-107964 is shown in FIG. 11. The first arms 61, 71 are respectively pivoted about the pin 63, 73 (pivot point) positioned at front and rear portion of a track frame 51. Idlers 52a and 52b are respectively rotationally mounted at a first member of the first arms 61, 71. The second arms 62, 72 are respectively rotationally mounted at a second member of the first arms 61, 71. The track rollers 64, 64 and 74, 74 are rotationally supported to both end portions of the second arms 62, 72. The stop portions 65, 75 are respectively formed on a outer and upper end portions of the first arms 61, 71, while the stop members 66, 76 are respectively formed on a front and rear portion of the track frame 51. The stop portions 65, 75 are respectively positioned to contact with the stop members 66, 76 upon upward pivoting of the first arms 61, 71 to limit such pivoting.

While upper portion of the first arm 54 is pivoted about the pins 58 which are located under the track frame 51 and between the track rollers 64, 64 and 74, 74, the other portion thereof is pivotally connected to substantially a central portion of the second arm 55. At either end portions of the second arm 55 are rotationally supported the track rollers 55, 57. The sprocket 53 is rotationally mounted at either sides of the vehicle body and positioned substantially above the rear idler 52b. The crawler 56 encompasses the idlers 52a, 52b the sprocket 53 and the track rollers 57, 64, 74. It will be seen that this track roller unit has the advantages that a total amount of travel combined an amount of the first arm 54 travel with an amount of the second arm 55 travel provide a quick and proper contact to the rail surfaces of the crawler 56 even when the vehicle is passing over relatively rough terrain.

Figure 12:
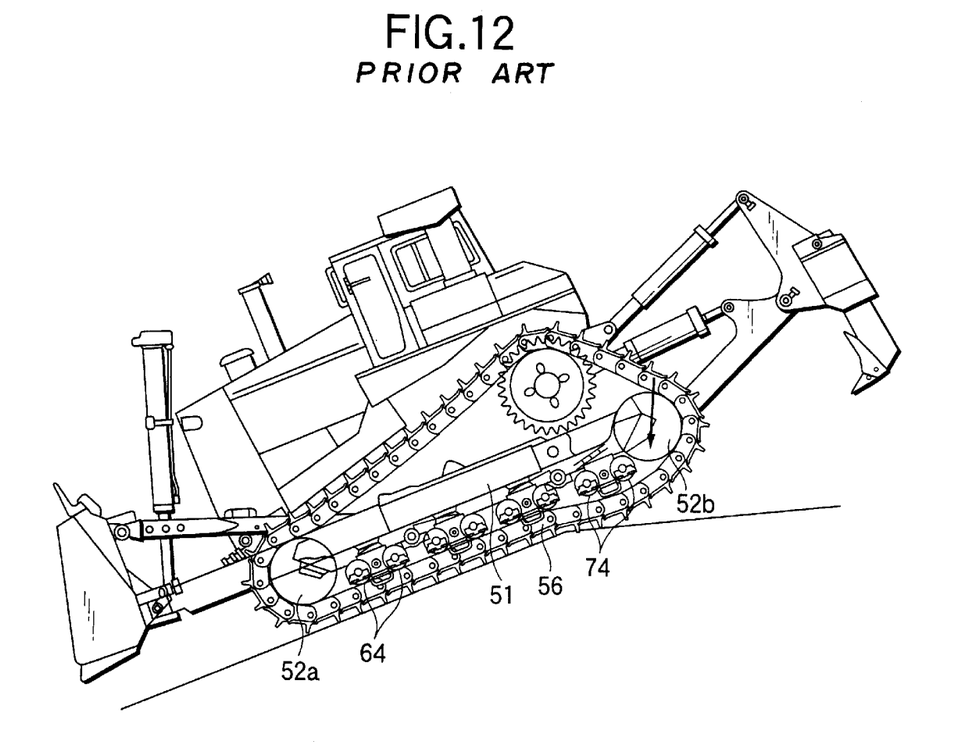
FIG. 12 is a side view of the action of the second prior art.

However, when the idlers 52a, 52b are respectively moved up and down in response of the action of the first arms 61, 71, an actual contact area between the track shoe 56 and ground tends to vary. Variation of the actual contact area causes the track rollers to prevent from serving completely as load bearing member. Accordingly, a trouble occurs that resulting frequent slip of the track shoe leads to provide a low tractive force of the vehicle. And also, when the vehicle is traveling backward and goes up a bump, as shown in FIG. 12, the rear idler 52b is urged to push downward by track shoe weight the adjacent above thereof, thereby the track rollers 74,74 associated with the first arm 71 tends to be prevented from reaching to its lowest position.

An amount of the track roller travel most adjacent the front and rear idlers 52a, 52b depend on running condition of the vehicle and balanced condition to the both idlers. Accordingly, the track rollers may be impossible to reaching to its lowest position as described already, result in providing improper contact to the rail surfaces of the track link.

It is strongly desirable that a great amount of the bogy track roller travel improves a flexibility of the track roller unit without being affected by the travel conditions, the balanced relation to the idlers and the like. And it is also desired that the work in a high tractive force is carried out with the track rollers provided with an unchangeable contact area to the ground.

The present invention is directed to overcoming the shortcomings of the prior attempt at improving adaptability to the track shoe, and securing stable contact areas.

DISCLOSURE OF THE INVENTION

It is an object of the present invention to provide in the crawler-type vehicle undercarriage having an idler, the sprocket and the track frame located substantially in a straight line, a multiple bogie track roller unit with which a great amount of the bogy track roller travel improves a flexibility of the track roller unit to the crawler without being affected by the travel conditions, the balanced relation to the idlers and the like, and work with a high tractive force is carried out with the track roller provided an invariable contact areas to the ground.

It is a still further object of the present invention to provide the crawler-type vehicle comprising an undercarriage which includes the idler, the sprocket and the track frame that includes a first arm pivotally mounted at the bottom of the track frame, a second arm pivotally connected to end portion of the first arm, a track roller unit including a first arm pivotally mounted at the bottom of the track frame, a second arm pivotally connected to end portion of the first arm, and track rollers supported to the either end portion of the second arm.

It is a still further object of the present invention to provide in a crawler-type vehicle comprising an undercarriage which includes an idler, the sprocket and the track frame located substantially in a straight line that a first arm pivotally mounted at the bottom of the track frame, the track roller unit most adjacent the sprocket is pivoted about a pivot center of the first arm positioned at the bottom of the track frame, toward the idler relative to a pivot center of the second arm.

It is a still further object of the present invention to provide in a crawler-type vehicle comprising an undercarriage which includes an idler, the sprocket and the track frame located substantially in a straight line that track roller units most adjacent the sprocket and the idler are respectively pivoted about the pivot center of the first arm positioned at the bottom of the track frame and toward the central portion of the track frame relative to the pivot center of the second arm.

BRIEF DESCRIPTION OF THE DRAWINGS

For a better understanding of the present invention, reference may be had to the accompanying drawings in which.

It is to be understood that drawing are not intended as a definition of the invention, but are provided for purpose of illustration only.

DESCRIPTION OF THE PREFERRED EMBODIMENT

Figure 1:
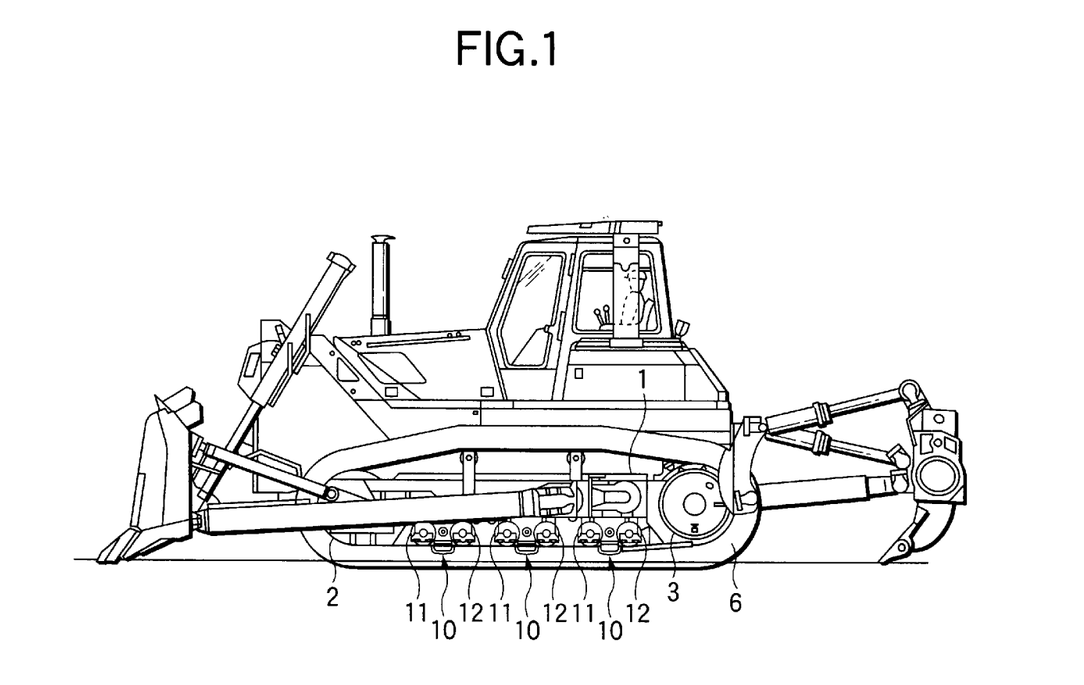
FIG. 1 is a side view of a crawler-type vehicle.
Figure 2:
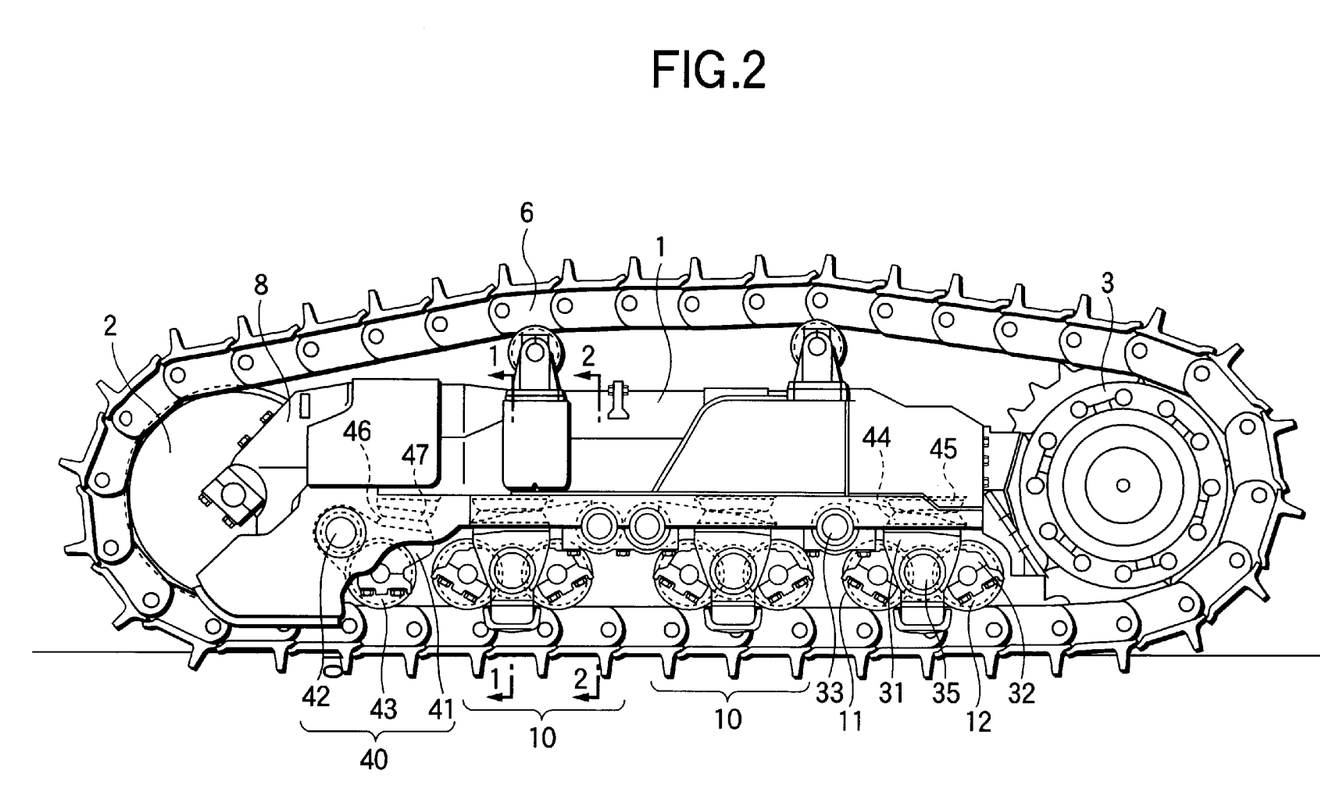
FIG. 2 is a side view of the crawler and a multiple bogie track roller unit of a crawler-type vehicle undercarriage combination.

Referring now to the drawings, and more particularly to FIGS. 1–9, preferred embodiment is shown. Numeral 10 and 40 in FIGS. 1 and 2 refer to a multiple track roller bogie unit and single track roller of the crawler-type vehicle, according to the teachings of the present invention. Showing generally in FIG. 1 is the crawler-type vehicle such as bulldozer including multiple bogie track roller units of the undercarriage. Referring to FIG. 2, a yoke 8 positioned at a front-end portion of the track frame recoils the idler 2 to slide therein in forward and rearward direction by means of a recoil spring (not shown). The undercarriage includes the track frame 1 disposed at either sides of a vehicle body (not shown), an idler 2 which serves to guide the track rollers and mounted rotationally to the yolk 8 at a front portion of the track frame 1, a sprocket 3 which serves to convert power from the engine into motion of the track and multiple track roller bogie unit 10 having respectively two track rollers 11, 12 positioning pivotally at under the track frame 1, and single track roller unit 40 supporting track roller 43 adjacent the idler 2.

The sprocket 3 is rotationally mounted on both sides of the vehicle body adjacent the rear end portion of the track frame 1. The double bogie track roller units 10 of the undercarriage are pivotally mounted under the track frame 1 between the idler 2 and the sprocket 3. The crawler 6 encompassed the idler 2, the sprocket 3, and a plurality of the track rollers 11, 12, 43.

Figure 3:
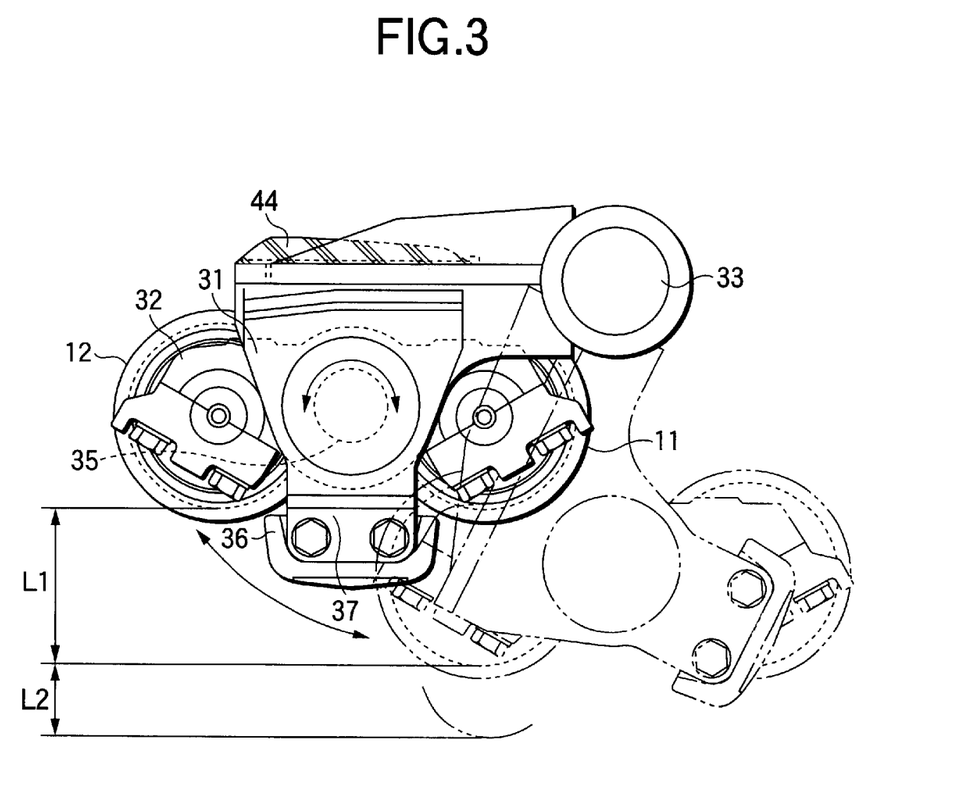
FIG. 3 is a partial side view of the track roller unit of FIG. 2.

In FIG. 3, the double bogie track roller unit 10 deposited at the bottom of the track frame 1 most adjacent the sprocket 3 is illustrated in detail (Seen from the right side of the vehicle, differing from FIG. 2). While the first portion of the first arm 31 is pivoted about a first pin 33, the second portion thereof is pivotally connected to a pivot portion located intermediate of the both end of a second arm 32 by means of a second pin 35. The track rollers 11, 12 are respectively and pivotally supported at the both end portions of the second arm 32. All of first pins 33 at which the first arm 31 is connected to the track frame 1 are deposited at the position between the second pin 35 and the idler 2, or toward middle portion of the track frame 1.

A resilient elements 44, 45 are respectively fixed to the upper portion of the first arm 31 and the bottom of the of the track frame 1, and positioned to contact each other, upon pivoting of the first arm 31 to limit such pivoting. With such a situation, the resilient elements absorb a heavy load shock occurred to the track rollers 11, 12 when the vehicle is passing over relatively rough terrain.

The arm 41 is pivoted about a pin 42 most adjacent the idler 2 at the bottom of the track frame 1. The track roller 43 is pivotally supported at the end portion of the arm 41. And also, the resilient element 46, 47 are respectively fixed on the upper end portion of the arm 41 and the track frame 1, and positioned to contact each other upon pivoting upwardly of the arm 41 to limit such pivoting.

In this embodiment, there are provided that two more sets of the double bogie track roller units 10,10 mounted between the double bogie track roller units 10 adjacent the sprocket 3 and the single track roller unit 40 adjacent the idler 2. With regard to this middle double bogie track roller unit 10, the positions of the pin 33 relative to the pin 35 may be the same as shown in the FIG. 3. Likewise, the same is true if that may be opposite as shown in the FIG. 3.

Figure 4:
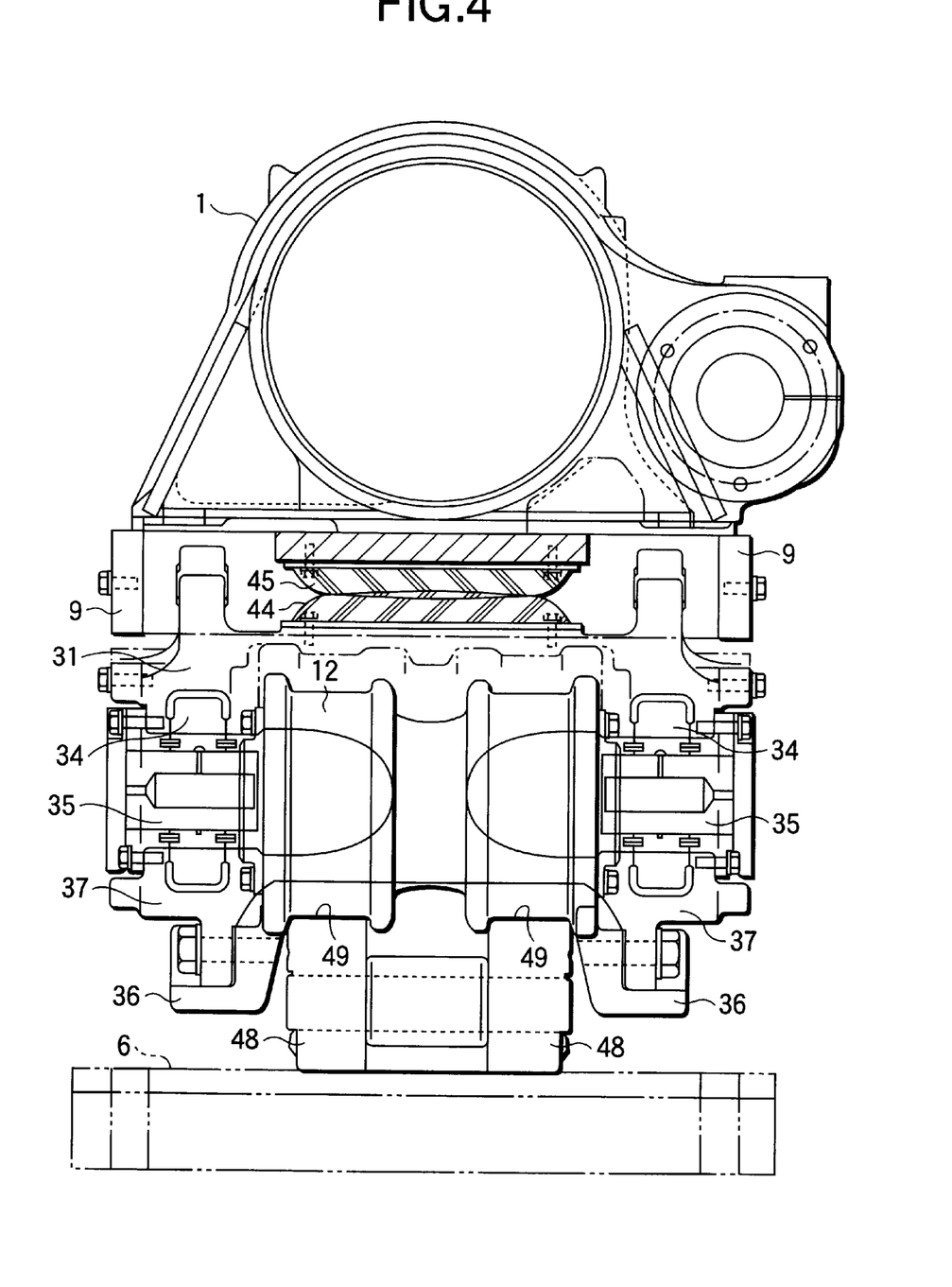
FIG. 4 is a sectional view taken along with the line 1—1 of FIG. 2.
Figure 5:
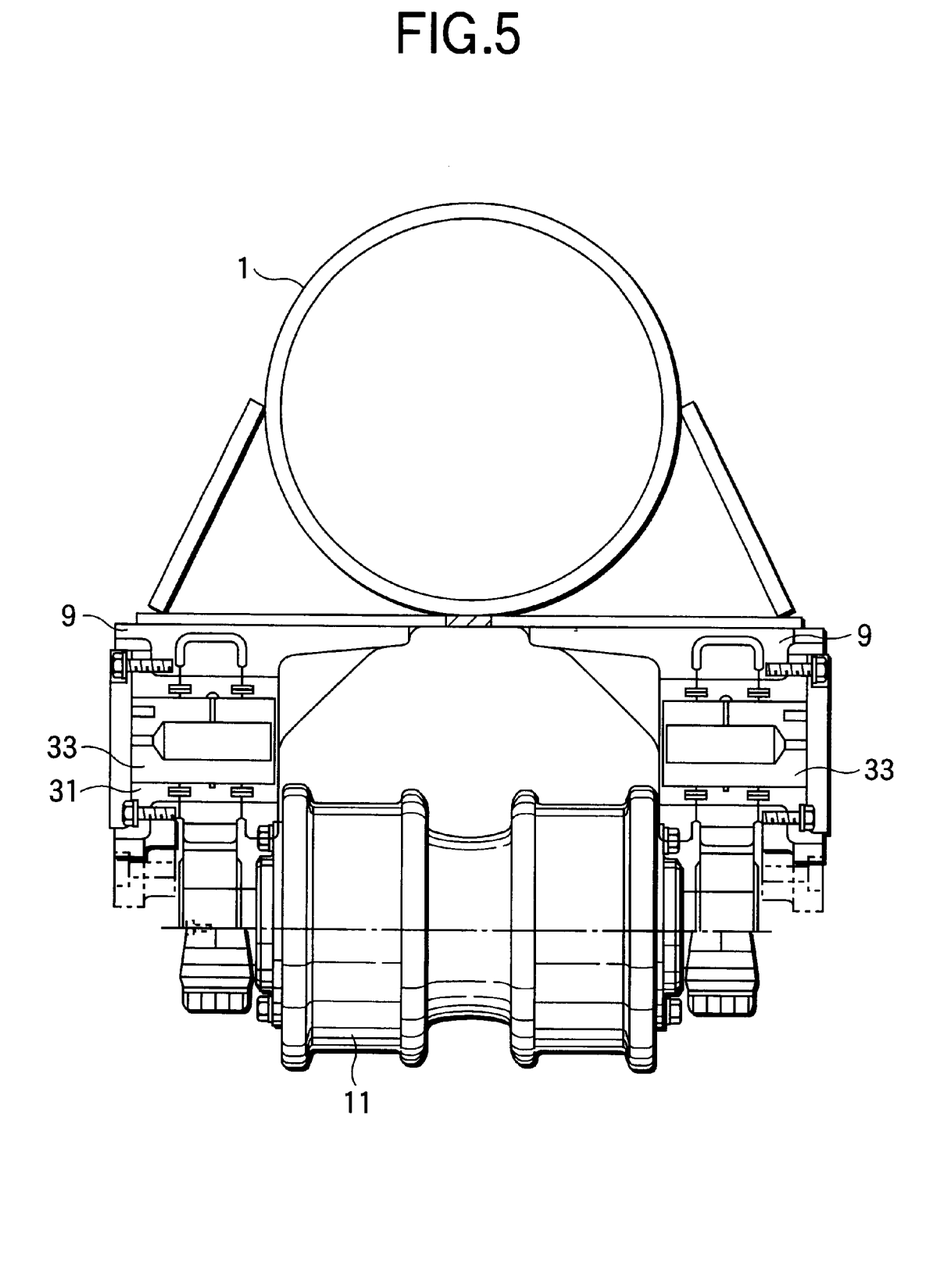
FIG. 5 is a sectional view taken along with the line 2—2 of FIG. 2.

Referring to FIGS. 4, 5, the double bogie track roller unit 10 will be described in detail. The extending downward plates 9, 9 are attached at the bottom portion of the track frame 1, and outboard and inboard sides thereof. The end portion of the first arm 31 is pivotally mounted between the outboard and inboard plates of the track frame 1 by means of a pair of the first pins 33. The section of the first arm 31 is formed an inverted U configuration at the end portion thereof. The support member pairs 37, 37 are respectively formed to the point portion of the outboard and inboard portion of the inverted chapter U shape of the track frame 1 to extend downwardly therefrom.

Similarly, the second arm 32 has laterally a pair of arm members 34, 34 which are respectively and pivotally interposed between the support member pairs 37, 37. The arm members 34, 34 are pivotally connected to end portion of the first arms 31, 31 at their approximately middle portion by the second pins 35, 35. Furthermore, the track rollers 11, 12 are pivotally supported at both ends of the second arm 32, namely between a pair of arm members 34, 34. A pair of brackets 36, 36 with a cross section formed L of shape, providing for acting as a guide means are respectively secured to the inside of the support member pairs 37, 37.so that one horizontal portion thereof is positioned outwardly, and other vertical portion thereof is respectively positioned along either side of each endless link chain 6 with them faced in opposite direction each other. The facing vertical portion of the bracket pairs 36, 36 is designed to define respectively an angled surface to enable to contact with the inboard end of the track link 48, actually being positioned to bear against the angle rail portion of the crawler 6 and avoid it from moving laterally.

INDUSTRIAL APPLICATION

A double bogie track roller unit 10 is utilized with the exception of the track roller 43 adjacent the idler 2. While the first arm 31 is pivoted about the first pin 33 (Large Bogie Structure), the central pivot portion of the second arm 32 is rotationally connected to the end portion the first arm 31 by means of the second pin 35 (Small Bogie Structure). The resulting amount of the track roller travel is combined with amount L1 of the first arm travel with an amount L2 of the second arm travel as illustrated in FIG. 3. Accordingly, a total amount of the track rollers 11, 12 exceeds that of the prior art without affecting the balanced relation to the idle 2 as set forth in the prior art, thereby causing the track rollers 11,12 to allow he occurrence of great variation in deflection and to act as guide therefore. A seen in FIG. 6, even when the crawler 6 adjacent and below of the sprocket 3 drops down due to the track weight and a distance between the crawler 6 and tack rollers 11, 12 results when the vehicle is traveling backward and goes up a bump, the track rollers 11, 12 tend to follow the rail surfaces 49, 49 of the track link 48 so as to be in quick and proper contact therewith.

Since the idler 2 and the sprocket 3 avoid respectively moving upwardly and downwardly relative to the track frame 1, what we call a hard idler or a hard sprocket, a real contact area between the crawler 6 and ground is maintained unchanged. In such a case, the track rollers 11, 12 tend to follow the track 6 so as to come into quick and proper contact therewith even when the vehicle is passed relatively over a bump. This leads to prevent the flanges of the track rollers from running on the rail surfaces 49, 49 of the track link 48 and derailment, and to becoming comfortable to ride in for operator. Since the crawler 6 envelops largely a bump, track rollers 11, 12 provide respectively for fully bearing against the vehicle weight. This leads to prevent the shock from occurring just after the vehicle is passed over the bump, result in improving the durability of the vehicle and becoming comfortable to ride in for operator. The unchangeable real contact area between the crawler 6 and ground causes the vehicle to drive in a high tractive force without occurring shoe slip.

Figure 6:
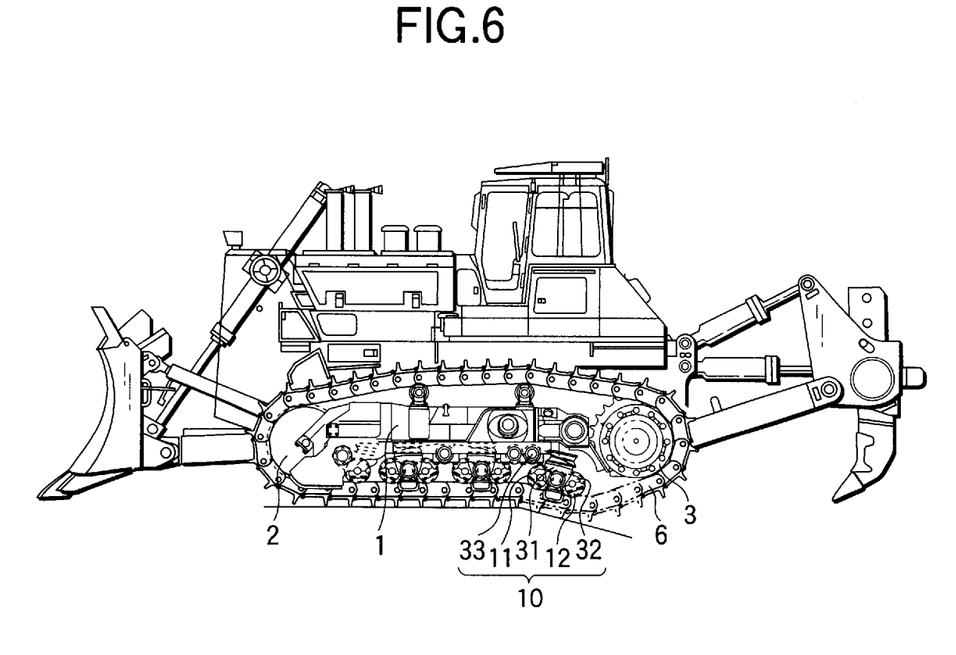
FIG. 6 is a side view of the action of the present invention when the vehicle is passing over relatively rough terrain.

Since the track rollers 11, 12 most adjacent the sprocket 3 is positioned between the sprocket and the first pin 33, thereby enabling to quickly follow a large deflection of the crawler 6 occurred adjacent below the sprocket 3. In FIG. 6, it will be seen that when the vehicle is passed over rough terrain in rearward direction, the turning force of the sprocket 3 tends to provide a large deflection of the crawler 6. With such a situation, the track rollers 11, 12 most adjacent below the sprocket 3 provide for following a large deflection of the crawler 6 to be a quick and good contact with the rail surfaces 49, 49 thereof, thereby enabling to correct the lateral movement thereof and to causes the track rollers to follow to provide a quick and proper contact with the rail surfaces 49, 49 of the track link 48.

A single track roller 43 deposited most adjacent below the idler 2 is mounted pivotally at the end portion of the arm 41 which travels up and down relative to the track frame 1 about the pin 42. (Large Bogie Structure) Its travel amount is relatively smaller than that of the double bogie track roller because it swings only about arm 41. It is understood that, differing from the sprocket 3, the idler 2, which serves as a guide means for crawler 6 and is not a driving means, is urged to properly recoil against the crawler 6 so that it can maintains good contact with ground and track rollers 11, 12 are still in guiding engagement with the crawler. Therefore, the deflection of the crawler 6 within a short distance from the idler 2 is relatively small, and the track roller with swinging motion by the arm 41 (Large Bogie Structure) secures a quick and proper contact therewith.

Figure 7:
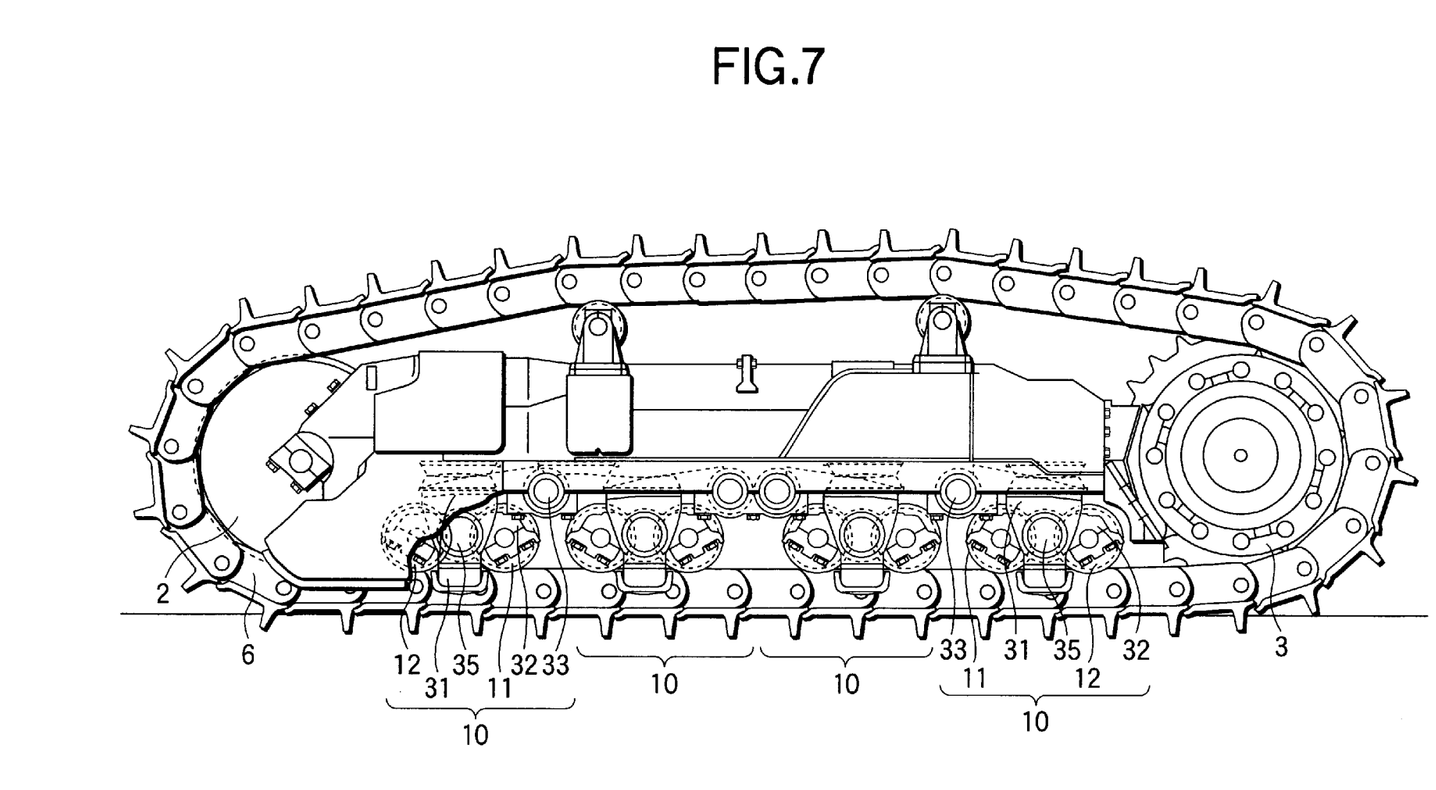
FIG. 7 is the crawler-type vehicle incorporating another inventive multiple bogie track roller units of a crawler-type vehicle undercarriage.

Regarding another embodiment shown in FIG. 7, the same is true if this track roller 43 is replaced with the double bogie track roller unit 10 as set forth. The first pin 33 being pivot point of the first arm 31 is preferably mounted on the track frame 1 so that it is positioned toward rearward relative to the pin 35 of the second arm 32, or longitudinally toward central portion of the track frame 1. This causes the track roller to allow following the crawler 6 so as to be in a quick and proper contact therewith and compensating a great amount of the track deflection occurred adjacent the idler 2 when the vehicle passes forwardly over the rough terrain. Accordingly, the following track rollers enable to succeed in following the crawler 6 just after the preceding track rollers.

Figure 8:
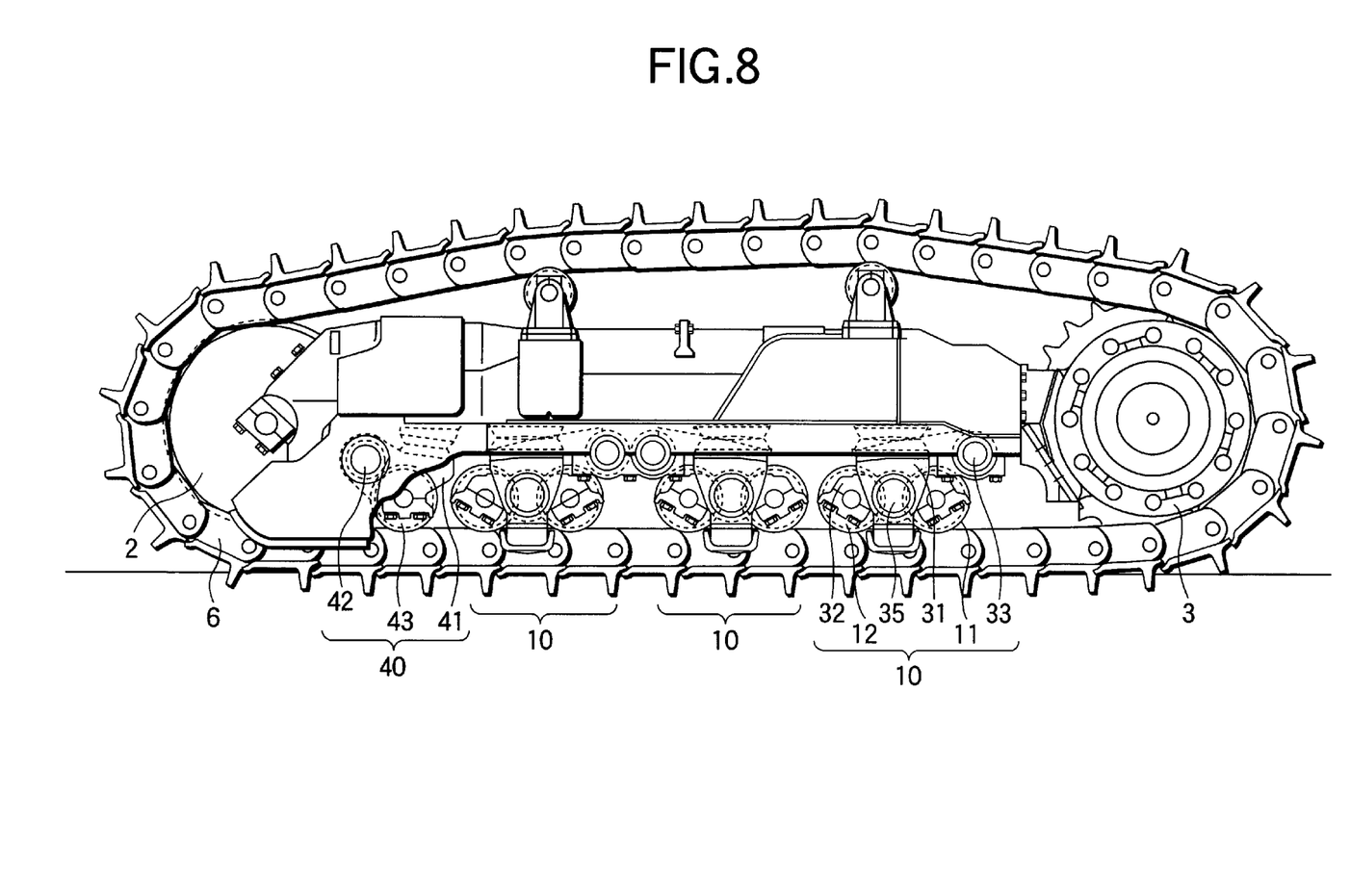
FIG. 8 is the crawler-type vehicle incorporating another inventive multiple bogie track roller units of a crawler-type vehicle undercarriage.

Regarding another embodiment shown in FIG. 8, the same is true if the first pin 33 being pivot point of the first arm 31 of the double bogie track roller unit 10 is pivotally mounted at the position between the pin 35 of the second arm 32 and the sprocket 3. Accordingly, a great amounts of the double bogie track roller unit travel provides for ensuring to quickly and properly follow the crawler 6 so as to be in a good contact therewith and compensating a great amount of the track deflection occurred adjacent below the sprocket 3 as set forth. This leads to prevent a heavy load shock from occurring just after the vehicle is passed over the bump or derailment of the crawler, result in improving the durability of the vehicle and becoming comfortable to ride in for operator. The unchangeable contact area between the crawler 6 and ground causes the vehicle to drive in a high attractive force without occurring shoe slip.

As is evident from the foregoing description, certain aspects of the present invention are not limited to the particular details of the examples illustrated herein, and it is therefore contemplated that other modifications and applications will occur to those skilled in the art. It is accordingly intended that the claims shall cover all such modifications and applications that do not depart from the spirit and scope of the invention.

What is claimed is:

1. A crawler-type vehicle undercarriage including a track frame mounted at both sides of the vehicle; an idler rotationally mounted at a front portion of the track frame; a sprocket rotationally mounted at a rear portion of the track frame; multiple track roller unit deposited under the track frame; a crawler encompassing the idler, the multiple track roller unit and the sprocket; the idler, the sprocket and the track frame being substantially located to line up in a straight line; the crawler-type vehicle undercarriage comprising:

the idler being fixed to avoid moving upwardly or downwardly relative to the track frame; and the multiple track roller unit including an end track roller unit arranged adjacent the sprocket, the end track roller unit including a first arm having a pivoted end pivotally mounted on the track frame and a single free end, the first arm pivoting exclusively bout a first pin on the track frame so that the single free end moves in an arc passing between the pivoted end of the first arm and the sprocket; a second arm pivotally connected to the single free end of the first a having to free ends; and a track roller rotationally supported on each of the two free ends of the second arm; the single free end of the first arm having two parts respectively extending about both sides and below the track rollers, and the two arts of the first arm being adapted to receive an endless link chain therebetween.

2. The crawler-type vehicle undercarriage of claim 1, wherein the multiple track roller unit includes another end track roller unit arranged adjacent the idler, the another end track roller unit including a third arm having a pivoted end pivotally mounted on the track frame and a single free end, the third arm pivoting exclusively about a second pin on the track frame so that the single free of the third arm moves in an arc passing between the pivoted end of the third arm and the idler; a fourth arm pivotally connected to the single free end of the third arm and having two free ends and a track roller rotationally supported on the two free ends of the forth arm.

3. A crawler-type vehicle undercarriage including a track frame mounted at both sides of the vehicle; an idler rotationally mounted at a front portion of the track frame; a sprocket rotationally mounted at a rear portion of the track frame; a multiple track roller unit deposited under the track frame; a crawler encompassing the idler, the multiple track roller unit and the sprocket; the idler, the sprocket and the track frame being substantially located to line up in a straight line; the crawler-type vehicle undercarriage comprising:

the idler being fixed to avoid moving upwardly or downwardly relative to the track frame; and the multiple track roller unit including an end track roller unit arranged adjacent the idler, the end track roller unit including a first arm consisting of a pivoted end pivotally mounted on the track frame and a single free end, the first arm pivoting exclusively about a first pin on the track frame so that the single free end moves in an arc passing between the pivoted end of the first arm and the idler; a second arm pivotally connected to the single free end of the first arm and having two free ends; and a track roller rotationally supported on the two free ends of the second arm.

* * * * *